UNITED STATES PATENT OFFICE.

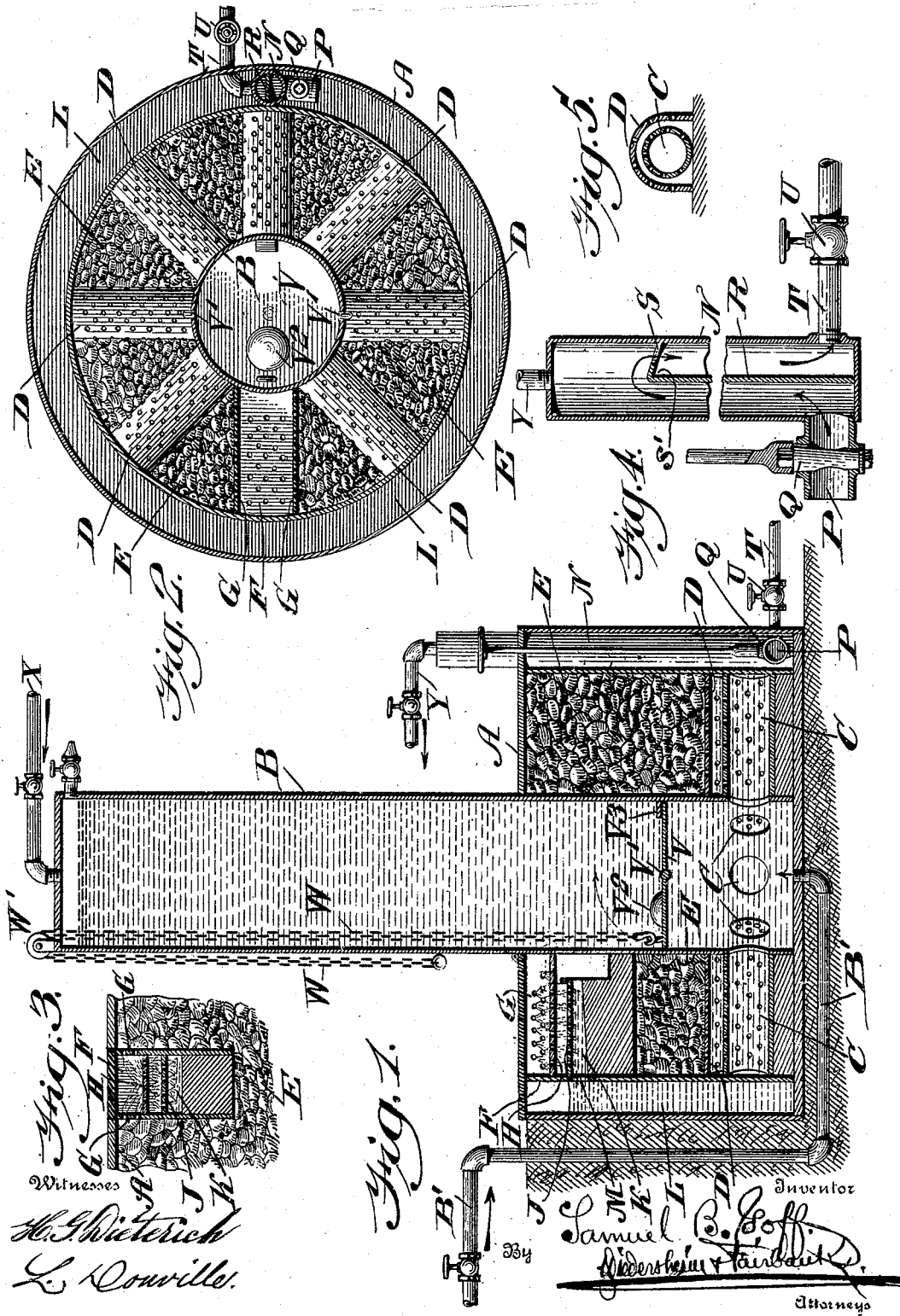

SAMUEL B. GOFF, OF CAMDEN, NEW JERSEY.

FILTER.

No. 919,849.  Specification of Letters Patent.  Patented April 27, 1909.

Application filed July 7, 1908. Serial No. 442,395.

*To all whom it may concern:*

Be it known that I, SAMUEL B. GOFF, a citizen of the United States, residing at Camden, in the county of Camden, State of New Jersey, have invented a new and useful Filter, of which the following is a specification.

My invention consists of an improvement in a filter, embodying novel means for receiving the supply of water and distributing it to a filter bed, means for directing the filtered water from said bed to a reservoir, and a stand-pipe at the discharge portion of the filter.

It consists further of details of construction, as will be hereinafter set forth.

For the purpose of explaining the invention, the accompanying drawings illustrate a satisfactory reduction of the same to practice, but the important instrumentalities thereof may be varied, and so it is to be understood that the invention is not limited to the specific arrangement and organization shown and described.

Figure 1 represents a vertical section of a filter embodying the invention. Fig. 2 represents a horizontal section thereof. Fig. 3 represents a vertical section of a portion at a right angle to the section shown in Fig. 1. Fig. 4 represents a vertical section of the stand-pipe and connected parts employed, on an enlarged scale. Fig. 5 represents a vertical section of one of the distributing pipes and guard therefor employed, on an enlarged scale.

Similar letters of reference indicate corresponding parts in the figures.

Referring to the drawings:—A designates the casing of the filter, and B designates a tower, which constitutes the primary receiving tank, the same, in the present instance, being centrally supported in said casing in any suitable manner, and having a supply pipe B'.

Radiating from the lower portion of said tower and in communication therewith are the perforated pipes C, over which are the perforated guards D, which also radiate from said tower, but are not in communication therewith. Superimposed on said guards are filtering substances or material E, which is contained in the casing A, the top of the latter being closed.

In the upper portion of the casing is the trough F, whose sides G and bottom H are perforated. Below said bottom is a strainer plate J, and below the latter is the inclined floor forming the chamber K, said trough, sides, bottom and floor being suitably secured to the wall of the casing A and tower B, they being surrounded by filtering substance or material E, as most plainly shown in Fig. 3.

Surrounding the casing A is the reservoir L, while K is a chamber in communication with the said reservoir by means of the port M in the wall of the casing at the outlet end of said chamber. In the reservoir is the stand-pipe N, which is in communication with the same by the branch P, the latter having a cock Q for turning-on and cutting-off purposes. Within the pipe N is a vertical division R, at the top of which is a perforated plate S, which is secured to the wall of said pipe N and sustains said division. Connected with the pipe N is the discharge pipe T, which is provided with a cock U for evident purposes.

Within the tower B near the lower portion thereof is the valve V, which has gudgeons V' mounted on the wall of said tower, it having a weight $V^2$ thereon for closing purposes, and the tower being provided with a stop-plate $V^3$ for holding said valve in closed position. In order to raise the said valve, a chain or other connection W is employed the same passing from said valve upwardly through the tower, and passing out of the same is guided on the pulley W, which is mounted on the tower, as plainly shown in Fig. 1.

In order to create a pressure of air on the water in the tower, there is connected with the top of the tower the pipe X, which leads from a suitable source of pressure and opens into the tower.

In order to exhaust air from the stand-pipe N, there is connected with the top of the same the pipe Y.

The operation is as follows:—Water is admitted by the supply-pipe B' into the tower B, the valve V being opened, so that the tower is practically filled. The water is then distributed from the tower into the pipes C, from which it escapes upwardly therefrom and through the guards D to the filtering material or filter-beds E, it being then subjected to the action of the latter, and so is filtered, in which condition, it reaches the perforated sides of the trough F and flowing through the same enters said trough and escapes therefrom, and passing through the strainer J, reaches the chamber K, discharges therefrom into the reservoir L, thus supplying the latter with the filtered water, which is directed into the pipe N, and from thence through the pipe T to the place of service. Should it be desired to subject the water to pressure, so as to direct it forcibly through the filtering-beds, this is accomplished by opening the valve of the pipe X. Should it be desired to exhaust the air from the stand-pipe N, the valve of the pipe Y is opened.

The valve V may be opened to an extent that it may be desired to allow the escape of water from the tower B to the distributing pipes C, and said valve may be completely closed to prevent the escape of water and thereby save the volume of the same in the tower above said valve, when the valve of the supply pipe B' is closed. Then said valve V is opened and the water in the tower above the latter falls forcibly on the deposits or impurities in the lower portion of the tower and washes the same through the filter, after which the fresh or unfiltered water is again turned on and the tower is refilled, and the filtration continues as before.

I have described my invention as applied to the filtration of water, but as is evident, it is serviceable for similar purpose for other fluids.

To compensate for any back pressure in the pipe T, and consequently in the stand pipe, the plate S in the latter is deflected angularly upwardly, where it joins the division R, thus providing a pocket S' at the inner angle of the plate and division, which in a measure checks said back pressure, thus preventing objectionable results therefrom.

Having thus described my invention, what I claim as new and desire to secure by Letters Patent, is:—

1. In a filter, a tank, a perforated pipe, a casing containing said tank and pipe, said pipe leading from said tank, a supply pipe for said tank, a filter-bed in said casing, a conductor for filtered fluid from said bed, a reservoir containing said tank, pipe and casing and with which said conductor is in communication, and a stand pipe in said reservoir outside said casing.

2. In a filter, a filter-bed, a conductor for filtered fluid in said bed, a chamber leading from said conductor, a reservoir surrounding said filter bed and in communication with said chamber and a stand pipe in said reservoir outside of said chamber.

3. In a filter, a tank, a pipe connected therewith, a casing containing said tank and pipe, a filter-bed in said casing, the same being adapted to receive unfiltered fluid from said pipe, a reservoir around said casing, means in the casing adapted to direct filtered fluid from said bed to said reservoir, and a stand-pipe in communication with said reservoir.

4. In a filter, a tank, means for supplying the same with unfiltered fluid, a casing containing said tank, means for directing the fluid from said tank, a filter-bed in said casing, means for discharging the filtered fluid from said bed, and means for creating pressure on the unfiltered fluid contained in said tank.

5. In a filter, a tank for unfiltered fluid, a casing containing the same and communicating therewith, a filter-bed in said casing, a reservoir for filtered fluid, means for directing the filtered fluid from said bed to said reservoir, a stand-pipe connected with said reservoir, and means for exhausting air from said pipe.

SAMUEL B. GOFF.

Witnesses:
JOHN A. WIEDERSHEIM,
HARRY C. DALTON.